United States Patent [19]

Grill et al.

[11] Patent Number: 5,344,599
[45] Date of Patent: Sep. 6, 1994

[54] PROCESS FOR PRODUCING SINTERED MAGNESIA

[75] Inventors: Michael Grill, Siracusa, Italy; Josef Deutsch, Leoben, Austria

[73] Assignee: Vietscher Magnesitwerke-Actien-Gesellschaft, Vienna, Austria

[21] Appl. No.: 982,751

[22] PCT Filed: Aug. 27, 1991

[86] PCT No.: PCT/AT91/00096
§ 371 Date: Mar. 5, 1993
§ 102(e) Date: Mar. 5, 1993

[87] PCT Pub. No.: WO92/04111
PCT Pub. Date: Mar. 19, 1992

[30] Foreign Application Priority Data

Sep. 5, 1990 [AT] Austria ................................ 1815/90

[51] Int. Cl.$^5$ .............................................. C04B 35/04
[52] U.S. Cl. .......................................... 264/63; 264/56; 264/117
[58] Field of Search ............................ 264/63, 117, 56

[56] References Cited

U.S. PATENT DOCUMENTS 2,579,886 12/1951 Vettel ................................... 264/117
4,003,736 1/1977 Kreiger ............................... 264/117

FOREIGN PATENT DOCUMENTS 0013182 7/1980 European Pat. Off. .
1376325 12/1974 United Kingdom .
2046658 11/1980 United Kingdom .

OTHER PUBLICATIONS

Robert H. Perry, Chemical Engineers' Handbook, 5th Edition, McGraw-Hill Book Company, New York, 1973, pp. 8-61 thru 8-63.

*Primary Examiner*—James Derrington
*Attorney, Agent, or Firm*—Sughrue, Mion, Zinn, Macpeak & Seas

[57] ABSTRACT

A process for producing coarse-grained sintered magnesia. The starting material is an active, reactive pulverulent magnesium oxide having a grain size of <0.15 mm and green compacts are formned from this magnesium oxide by pelletising on a granulating disc at a material throughput of less than 250 kg of MgO/m$^2$ disc area and per hour, which are subsequently subjected to sinter-firing at high temperature.

13 Claims, 3 Drawing Sheets

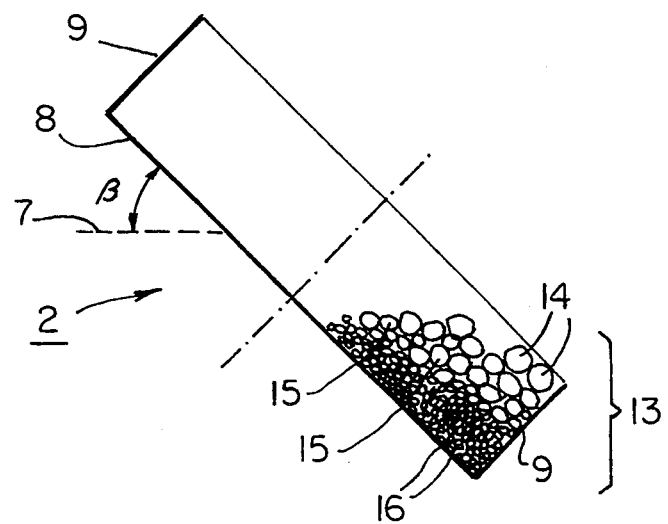
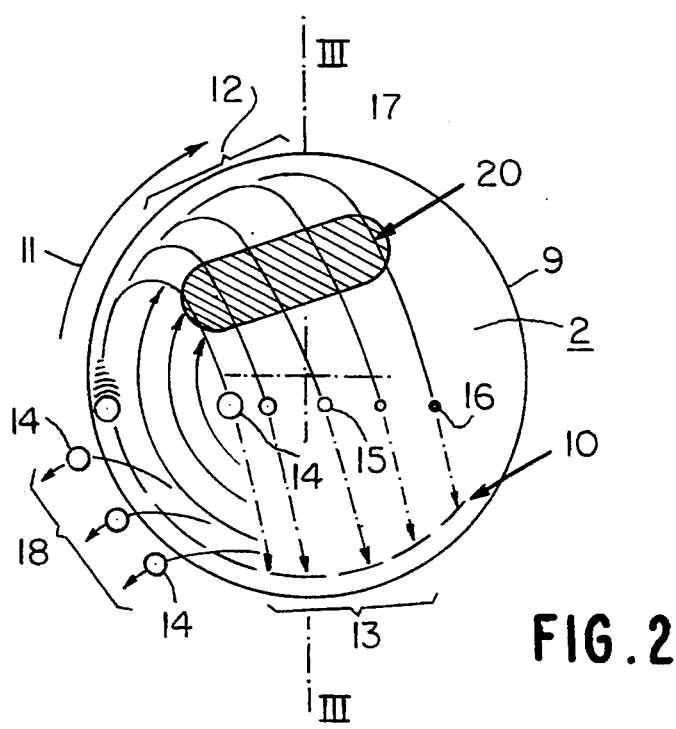

PROCESS FOR PRODUCING SINTERED MAGNESIA

BACKGROUND OF THE INVENTION

The invention relates to a process for producing coarse-grained sintered magnesia, starting from a pulverulent magnesium oxide, converting this into green compacts and subjecting the green compacts to sinter-firing at high temperature.

To obtain the desired high-temperature strength in sintered magnesia products, it is necessary to achieve a sufficiently high density of the sintered magnesia, which is usually abbreviated to "sinter". As a rule, an apparent density of the sintered magnesia of 3.3 g/cm$^3$ is regarded as a minimum value, but the aim is to reach apparent densities above 3.4 g/cm$^3$. In order to meet this aim, the green compacts which are to be subjected to the sintering treatment at high temperature, at which deadburning of the material takes place, must already have a sufficiently high density of at least about 1.7 g/cm$^3$, but preferably more than 2.3 g/cm$^3$, and a structure which tends to give considerable compaction on mild firing. To form such green compacts, magnesium oxide has hitherto been compacted by means of mechanical presses, so-called briquetting roller presses having in particular been used for this compaction. However, the use of mechanical presses for the formation of green compacts of a density which meets the abovementioned demands, requires a relatively large investment expense and, in operation, the consumption of considerable quantities of energy, because very high forces must be applied for compacting the pulverulent magnesium oxide. In spite of the application of high forces, however, a relatively large proportion of the green compacts provided by the presses has an unduly low mechanical strength. Such green compacts disintegrate during the manipulation which follows pressing and, for reprocessing the material which was contained in these green compacts, this material must be screened off and subjected to repeated pressing, which results in a considerable increase in the energy consumption required for pressing and a corresponding decrease in the production output of the presses, since, in fact, a considerable part of the magnesium oxide to be processed must be compacted several times.

SUMMARY OF THE INVENTION

It is an object of the present invention to provide a process of the type described at the outset, which allows the production of sufficiently dense-fired coarse-grained sintered magnesia at substantially lower investment and operating energy costs than the abovementioned known technology. The process according to the invention, of the type described at the outset, is characterised in that the green compacts, which are subjected to sinter-firing, are formed from an active, reactive pulverulent magnesium oxide of a grain size of <0.15 mm by pelletising on a granulating disc at a material throughput of less than 250 kg of MgO/m$^2$ of disc area and per hour. Such a reactive magnesium oxide is, for example, "caustic"-burnt magnesia.

Preferably, ground caustic magnesium oxide, which has a grain size distribution in which 90% of the material is smaller than 0.1 mm, is converted into the green compacts. This is also particularly advantageous from an economic aspect, because caustic magnesium oxide of this grain size can as a rule be made available at favourable conditions.

The abovementioned objective can be well met by the design, according to the invention, of a process of the type here under discussion. The pelletising on a granulating disc can be carried out at a relatively low drive power and allows the formation of green compacts having a sufficiently high density, as mentioned above, while maintaining the indicated conditions.

It may be mentioned here that the use of pelletising for coarsening the grain of fine-grained substances is known in various fields of technology such as, for example, in the treatment of cement raw meal or in the treatment of fine-grained iron ores. Usually, in these known technologies where provision is made for pelletising, the material throughput provided with the use of granulating discs is between 1 and 8 tonnes/m$^2$ of disc area and per hour. Using such a known technology, it is virtually impossible to agglomerate pulverulent magnesium oxide to green compacts which have sufficient density to undergo an adequate further compaction during such subsequent sinter-firing at high temperature. Only the departure, intended in the process according to the invention, from parameters which characterise the hitherto conventional granulation, and especially a departure from the hitherto conventional material throughput, makes it possible in the process according to the invention to obtain green compacts in a simple manner which have a density and strength which permit operation of the subsequent sinter-firing at high temperature without problems and thus to achieve a further substantial compaction in the course of this hightemperature firing.

The use of pelletising to be carried out on a granulating disc also has the further advantage of an automatic size classification of the granules discharged from the granulating disc, in such a way that only the largest granules present at the time on the granulating disc are discharged, whereas smaller granules continuously increase in size, as long as they are still in the granulating disc. The discharge of the green compacts formed in the granulating disc from the granulating disc is effected automatically by the intended construction of such a granulating disc; such a granulating disc is a cylindrical dish having a rim rising from the edge of the disc bottom, and this dish is mounted to be rotatable about an axis located centrally in the bottom of the dish. The plane laid through the disc bottom extends with an inclination to the horizontal at an angle of about 40° to 70°. The material to be agglomerated is fed continuously to this disc together with a binder and, because of the sorting action of the disc, passes initially into the region of the lowest point of the disc. Due to the rotation of the disc, the material fed agglomerates gradually to give increasingly growing bodies which, with increasing size, rise upwards in the disc and are finally discharged over the edge of the rim. Thus, the largest granules at the time leave the granulating disc at the overflow, whereas the fines remain at the lowest point of the solids bed in the granulating disc until they are incorporated into granules. Thus, exclusively well-formed granules which, in the present process, also have good strength, are discharged from the granulating disc, virtually no fine material being entrained.

In the interest of the highest possible density of the granules which are produced in the process according to the invention and which form the green compacts, it is preferably provided in the process according to the invention that the material throughput (depending on the grain size) is maintained at between 35 and 220 kg/m² of disc area and per hour. If the pulverulent magnesium oxide to be processed has a relatively large grain size, the material throughput in the lower part of this range is, as a rule, advisable, in order to obtain, in a simple manner, green compacts having the desired high density.

With respect to the material throughput, an embodiment of the process according to the invention is preferably provided, which is characterised in that the granulation is operated at a material throughput which is within the area region, defined by the corner points given below, of the area quadrant formed by the abscissa indicating the material throughput (kg/m²×h) and by the ordinate indicating the median value $d_{50}$ of the grain size (mean grain size $d_{50}$) of the magnesium oxide, the corner points of this area region being located approximately at:

| | | |
|---|---|---|
| A) | 21 μm - | 25 kg/m² × h |
| B) | 21 μm - | 70 kg/m² × h |
| C) | 3.0 μm - | 220 kg/m² × h |
| D) | 0.5 μm - | 220 kg/m² × h |
| E) | 0.5 μm - | 75 kg/m² × h |
| F) | 10 μm - | 25 kg/m² × h. |

In the area region located between the corner points D), E), F) and A) and the abscissa axis and ordinate axis, operation is possible from a technical viewpoint, but is disadvantageous economically.

It is also advantageous when a mean residence time of the material on the granulating disc of about ½ hour to 2 hours, preferably about 1 hour, is maintained in the granulation. For this purpose, the rim height of the granulating disc can be selected such that a dynamic disc content is established which guarantees that the intended mean residence time of the material in the granulating disc at a particular given disc inclination is maintained.

It is then advantageous when a granulating disc is used whose rim height is greater than ¼ of the disc diameter. The inclination β of the granulating disc relative to the horizontal is advantageously selected to be between 55° and 65°.

The speed of rotation of the granulating disc is appropriately selected empirically in such a way that the fines of the material present in the granulating disc are taken along in the direction of rotation up to just before the upper vertex of the granulating disc; in this way, smooth disc operation and maximum classification of the granules can be achieved.

In the simplest case, water can be used as the binder for granulation, it being possible for the added quantity to be fixed empirically by observing the granules being formed, and the aim is then to find the smallest possible quantity of binder which suffices. At a correctly set quantity of binder, granules having a smooth surface are obtained. If too much binder (for example water) is added, the result is in most cases a blackberry-like appearance of the granules; if too little binder (for example water) is added, granules result whose surface has the appearance of a golf ball (indentations on the surface). The use of water as the binder for granulation has the advantage that no extraneous materials, which might have an interfering effect, are introduced into the granules by the binder.

In the sinter-firing of green compacts bound only with water, a careful procedure is necessary, because granules bound only with water suffer a drop in strength during heating in the range from about 400° C. to 700° C. This can be counteracted by using as granulation binder an aqueous solution or suspension of a binder material which, on sinter-firing, volatilises virtually without residue or forms magnesium oxide as the residue, such as, for example, magnesium sulphate, magnesium chloride or magnesium lignosulphonate (sulphite waste liquor).

The invention is now explained in more detail with reference to the drawing and to the examples.

BRIEF DESCRIPTION OF THE DRAWINGS

In the drawing, FIG. 2 shows a front view of a granulating disc and FIG. 3 shows such a granulating disc in the section taken along the line III—III in FIG. 2.

DETAILED DESCRIPTION OF THE INVENTION

Figure 1:
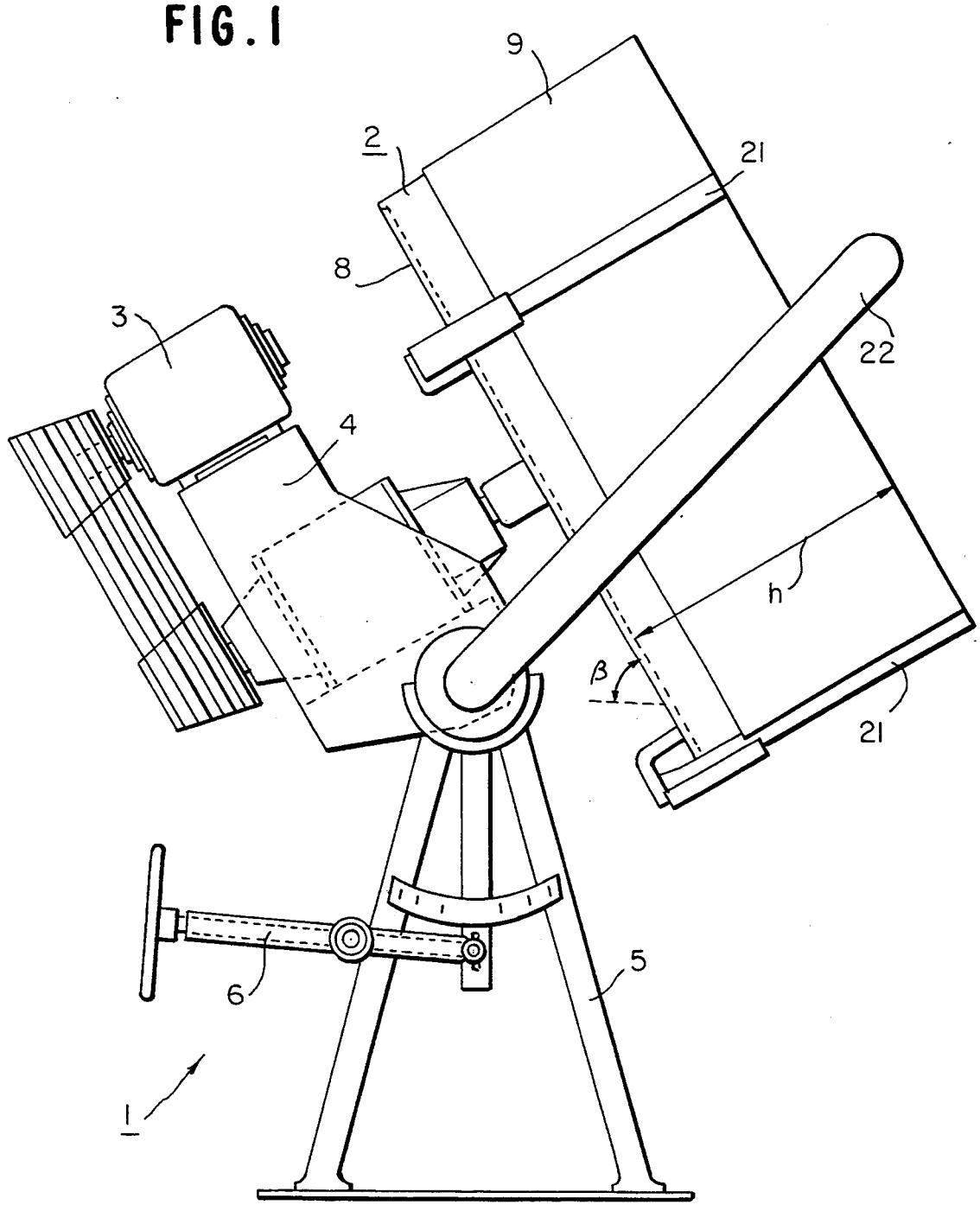
FIG. 1 shows a side view of an example of a granulating device provided with a granulating disc.

The granulating device shown in FIG. 1 has a granulating disc 2 which is rotatably mounted on a drive unit 4 provided with a motor 3 and is arranged for pivoting, together with this drive unit, on a support frame 5. The inclination β of the granulating disc 2 relative to the horizontal 7 can here be adjusted by means of a pivoting device 6. The speed of rotation of the granulating disc is adjustable. The granulating disc 2 has a preferably flat bottom 8 (that is to say it is designed without internals, steps or the like), a rim 9 being provided along its peripheral edge. In this embodiment of the granulating device, the rim 9 is guided heightadjustably on holders 21, so that the height h of the rim can be adjusted to the value desired in a particular case. A support 22 fixed to the frame 5 is intended for the fitting of auxiliary devices, such as a spray device or a scraper.

In FIGS. 2 and 3, the mode of functioning of a granulation process carried out on a granulating disc 2 is indicated diagrammatically. The pulverulent material, from which the green compacts are formed by pelletising, is charged at 10 to the granulating disc and taken along in the granulating disc by the rotation thereof, which is indicated by the arrow 11, in the direction of rotation. As soon as the force of gravity acting on the particles prevails, which takes place in the region 12 in the example shown in FIG. 2, the particles fall back into the lower region 13 of the granulating disc 2. In the region 20, binder, for example water, is sprayed into the granulating disc. As a result, in the course of the tumbling motion of the material present in the granulating disc, the particles come together and form spherical granules which grow in the course of the granulation process by continuous accretion of further material. As viewed in the direction of rotation 11, the larger granules or bodies 14 drop back first in the region 12, followed by the granules 15 of medium size and finally by the particles 16, forming the fines, dropping into the lower region 13 of the granulating disc. The position of the region 12, up to which the particles are taken along in the granulating disc by the rotation thereof, can be changed by varying the speed of rotation of the granulating disc. Preferably, the speed of rotation of the granulating disc is adjusted such that the particles 16 forming the fines fraction are taken along as far as just before the upper vertex 17 of the granulating disc 2. Such an adjustment assists the automatic size classification in the granulating disc 2 in such a way that the particles 16 forming the fines are located at the bottom in the lower region 13 of the granulating disc, as FIG. 3 shows, and the larger granules or bodies 14 are located at the top. If pulverulent material is continuously fed to the granulating disc, which can be effected via a metering device, for example a proportioning belt weigher, discharge of the largest granules 14 over the edge of the rim 9 of the granulating disc 2 automatically takes place continuously, as indicated at 18. These granules 14 represent the green compacts formed by the pelletising. The smaller and/or medium-size granules 15 continuously increase in size, as long as they are in the granulating disc 2, by accretion of particles 16 which form the fines.

EXAMPLE 1

A granulating disc with a diameter of 1000 mm and a rim height of 500 mm, which had a flat bottom without internals, steps or the like, the bottom being inclined at an angle $\beta = 60°$ to the horizontal, was continuously charged with pulverulent synthetic, caustic-burnt magnesia at a rate of 100 kg/m$^2$×h, relative to the area of 0.785 m$^2$ of the granulating disc. A proportioning belt weigher was used for charging. At the same time, water as a binder was sprayed in at a rate of 200 l per ton of magnesia via a control valve, a flow meter and a fanned nozzle into the granulating disc. Alternatively, an aqueous binder in the form of an aqueous solution of magnesium lignosulphonate or magnesium chloride or magnesium sulphate was also used. The speed of rotation of the granulating disc was empirically adjusted in the range of 18–21 rpm in such a way that the fines of the material present in the granulating disc were taken along by the rotation as far as the vicinity of the upper vertex of the granulating disc. Granules of a diameter of between 10 and 25 mm were discharged continuously. To prevent sticking of material to the granulating disc, a scraper fitted to the frame of the granulating device was provided. The addition of the aqueous binder to the magnesium oxide results in heating of the content of the granulating disc because of the enthalpy of reaction released in the reaction $MgO + H_2O \rightarrow Mg(OH)_2$. The discharged granules were therefore at a temperature of 130°–150°. When water was used as the binder, the granules had a spot compressive strength of about 1000–1300N. The apparent density of the granules representing the green compacts was 2.2–2.5 g/cm$^3$ in the dried state. These granules or green compacts were then fired at 2000° C. and, after firing, had a density of 3.41 g/cm$^3$.

EXAMPLES 2 TO 14

Figure 4:
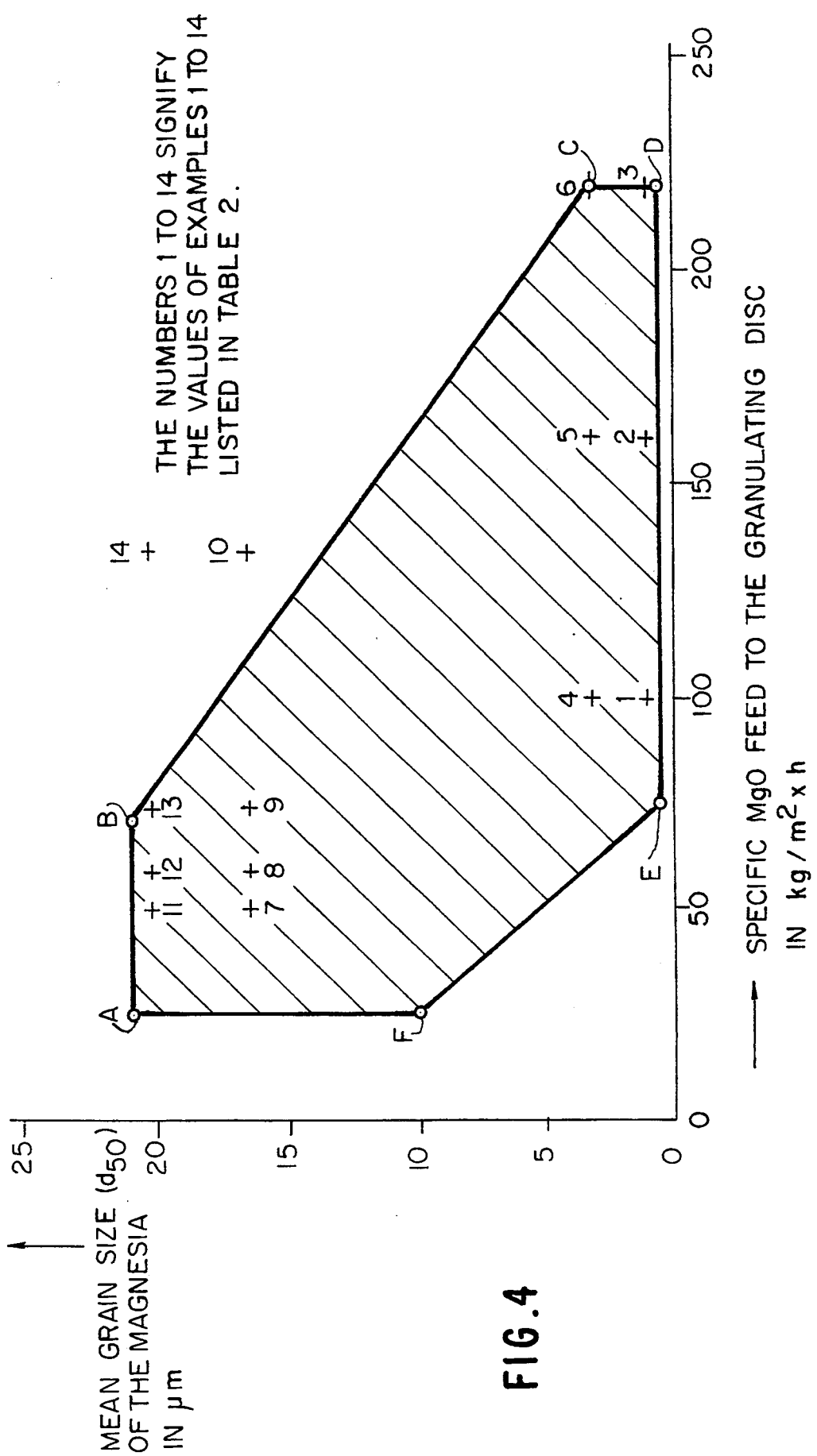
FIG. 4 shows a diagram for selecting the material throughput at a defined given grain size of the pulverulent magnesium oxide to be processed.

The procedure was analogous to Example 1, four different types of caustic-burnt magnesia being used as starting material, the mean grain size (median value d$_{50}$, i.e. that grain size at which 50% of the material are smaller than the indicated value) and the composition thereof in % by weight (also % by mass) being specified in Table 1 which follows. The materials used in the individual examples, the quantities thereof and the analytical values of the products obtained and also the temperatures applied in each case in firing of the green compacts are listed in Table 2 which follows. The pairings of material throughput (material feed to the granulating disc) and mean grain size of the particular magnesia used, intended in the individual examples, are entered in FIG. 4, and the working region which is preferred within the scope of the invention and which is located within the line track running through the corner points A) to E), is also drawn in.

TABLE 1

| Composition of the magnesium oxide | | 1. Synthetic magnesia | | 2. Magnesia from burnt natural magnesite (MgCO$_3$) | |
| --- | --- | --- | --- | --- | --- |
| | | 1 a | 1 b | 2 a | 2 b |
| Mean grain size d$_{50}$ | [μm] | 0.9 | 3.0 | 16.3 | 20.1 |
| GV | [%] | 1.57 | 3.3 | | |
| Fe$_2$O$_3$ | [%] | 0.02 | 5.37 | | |
| CaO | [%] | 0.42 | 1.92 | | |
| SiO$_2$ | [%] | 0.03 | 0.42 | | |
| MgO (ignited) | [%] | 99.45 | 91.8 | | |

TABLE 2

| Example No. | Type of caustic MgO meal according to table | Mean grain size of MgO meal (d$_{50}$) (μm) | MgO meal feed [kg/m$^2$ × h] | Binder feed [H$_2$O] [l/t of MgO] | Spot compressive strength of the green granules [N] | Loss on ignition of the green granules [%] | Diameter of the green granules [mm] | Apparent density of the green granules* [g/cm$^3$] | Firing temperature [°] | Apparent density of the granules after firing [g/cm$^3$] |
| --- | --- | --- | --- | --- | --- | --- | --- | --- | --- | --- |
| 1 | | | 100 | | | | | | | 3.41 |
| 2 | 1 a | 0.9 | 160 | | | 12–14 | | | | 3.35 |
| 3 | | | 220 | | | | | 2.2–2.5 | | 3.30 |
| | | | | about 200 | | | | | 2000 | |
| 4 | | | 100 | | | | | | | 3.38 |
| 5 | 1 b | 3.0 | 160 | | | 11–13 | | | | 3.33 |
| 6 | | | 220 | | | | | | | 3.32 |
| | | | | | 1000–1300 | | 10–25 | | | |
| 7 | | | 50 | | | | | | | 3.44 |
| 8 | 2 a | 16.3 | 60 | | | | | | | 3.37 |
| 9 | | | 75 | | | | | | | 3.32 |
| 10 | | | 135 | | | | | 2.0–2.2 | | 3.25 |
| | | | | about 150 | | 5–7 | | | 1800 | |
| 11 | | | 50 | | | | | | | 3.42 |
| 12 | 2 b | 20.1 | 60 | | | | | | | 3.39 |
| 13 | | | 75 | | | | | | | 3.31 |
| 14 | | | 135 | | | | | | | 3.20 |

*Dry

I claim:

1. Process for producing coarse-grained sintered magnesia, starting from pulverant magnesium oxide, converting said magnesium oxide into green compacts and subjecting the green compacts to sinter-firing at high temperature until said sinterfired green compacts have an apparent density of at least 3.3 g/cm$^3$, characterised in that the green compacts which are subjected to sinter-firing are formed from an active, reactive pulverant magnesium oxide of a grain size of <0.15 mm and formed by pelletising on a granulating disc at a material throughput of less than 250 kg of MgO/m$^2$ of disc area and per hour, wherein the pulverant magnesium oxide has a mean residence time on the granulating disc of ½ to 2 hours.

2. Process according to claim 1, characterized in that ground caustic magnesium oxide is converted into the green compacts.

3. Process according to claim 2, characterized in that ground caustic magnesium oxide, which has a grain size distribution in which 90% of the material is smaller than 0.1 mm, is converted into said green compacts.

4. Process according to claim 1, characterized in that the material throughput is maintained at between 35 and 220 kg of MgO per m$^2$ of disc area and per hour.

5. Process according to claim 2, characterized in that the material throughput is maintained at between 35 and 220 kg of MgO per m$^2$ of disc area and per hour.

6. Process according to claims 4 or 5, characterized in that the material throughout is maintained at between 50 and 120 kg per m$^2$ of disc area and per hour.

7. Process according to claim 4, characterized in that the granulation is operated at a material throughput which is within the area region defined by the corner points given below, of the area quadrant formed by the abscissa indicating the material throughput (kg/m$^2$×h) and by the ordinate indicating the median value d$_{50}$ of the grain size (mean grain size d$_{50}$) of the magnesium oxide, the corner points of this area region being located approximately at:

| | | |
|---|---|---|
| A) | 21 μm - | 25 kg/m$^2$ × h |
| B) | 21 μm - | 70 kg/m$^2$ × h |
| C) | 3.0 μm - | 220 kg/m$^2$ × h |
| D) | 0.5 μm - | 220 kg/m$^2$ × h |
| E) | 0.5 μm - | 75 kg/m$^2$ × h |
| F) | 10 μm - | 25 kg/m$^2$ × h. |

8. Process according to claim 5, characterized in that the granulation is operated at a material throughput which is within the area region defined by the corner points given below, of the area quadrant formed by the abscissa indicating the material throughput (kg/m$^2$×h) and by the ordinate indicating the median value d$_{50}$ of the grain size (mean grain size d$_{50}$) of the magnesium oxide, the corner points of this area region being located approximately at:

| | | |
|---|---|---|
| A) | 21 μm - | 25 kg/m$^2$ × h |
| B) | 21 μm - | 70 kg/m$^2$ × h |
| C) | 3.0 μm - | 220 kg/m$^2$ × h |
| D) | 0.5 μm - | 220 kg/m$^2$ × h |
| E) | 0.5 μm - | 75 kg/m$^2$ × h |
| F) | 10 μm - | 25 kg/m$^2$ × h. |

9. Process according to claim 1 or 2, characterized in that the mean residence time is about 1 hour.

10. Process according to claim 1 or 2, characterized in that the granulating disc has a rim height greater than ¼ of the disc diameter.

11. Process according to claim 1 or 2, characterized in that a granulating disc is used whose rim height is greater than ¼ of the disc diameter and that said granulating disc is operated with an inclination β if the granulating disc to the horizontal of between 55° and 65°.

12. Process according to claim 1 or 2, characterized in that water is used as a binder for granulation.

13. Process according to claim 1 or 2, characterized in that an aqueous solution or suspension of a binder material which, on sinter-firing, volatilises virtually without residue or forms magnesium oxide as residue is used as a binder for granulation.

* * * * *